(12) United States Patent
Nakashima et al.

(10) Patent No.: US 6,470,385 B1
(45) Date of Patent: Oct. 22, 2002

(54) NETWORK MONITORING SYSTEM, MONITORED CONTROLLER, AND MONITORING CONTROLLER

(75) Inventors: Kazuhiro Nakashima; Shigeru Nakagawahara, both of Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/137,642

(22) Filed: Aug. 20, 1998

(30) Foreign Application Priority Data

Mar. 20, 1998  (JP) .......................................... 10-071757

(51) Int. Cl.$^7$ ............................................... G06F 11/30
(52) U.S. Cl. ..................... 709/224; 370/390; 370/395.1; 714/4; 714/47
(58) Field of Search ................................ 709/223–229; 370/390, 252, 395.1; 714/4, 47

(56) References Cited

U.S. PATENT DOCUMENTS

| | | | | |
|---|---|---|---|---|
| 5,333,308 A | * | 7/1994 | Ananthanpillai | 714/4 |
| 5,644,717 A | * | 7/1997 | Clark | 709/224 |
| 5,748,882 A | * | 5/1998 | Huang | 714/47 |
| 5,761,429 A | * | 6/1998 | Thompson | 709/224 |
| 5,764,913 A | * | 6/1998 | Jancke et al. | 709/224 |
| 6,021,117 A | * | 2/2000 | Juniper et al. | 370/252 |
| 6,047,324 A | * | 4/2000 | Ford et al. | 709/227 |
| 6,112,983 A | * | 9/2000 | D'Anniballe et al. | 235/379 |
| 6,122,277 A | * | 9/2000 | Garmire et al. | 370/390 |

FOREIGN PATENT DOCUMENTS

| | | |
|---|---|---|
| JP | 57-124949 | 8/1982 |
| JP | 7-183932 | 7/1995 |
| JP | 7-184279 | 7/1995 |

OTHER PUBLICATIONS

McLean, Michelle R., "Testing comes to ATM", LAN Times, pp(2), Dec. 18, 1995.*

Graziano, Claudia, "ATM Monitoring Goes Mainstream", LAN Times, pp(2), Sep. 11, 1995.*

McLean, Michelle R., "Cisco Rocks ATM's Boat", LAN Times, pp(2), Mar. 18, 1996.*

* cited by examiner

Primary Examiner—St. John Courtenay, III
(74) Attorney, Agent, or Firm—Katten Muchin Zavis Rosenman

(57) ABSTRACT

A network monitoring system which alleviates workloads imposed on network devices being monitored, reduces network traffic, improves the quality of data transmission, and increases the efficiency of monitoring activities. The system comprises a connection set-up unit which establishes a point-to-multipoint connection between a network device to a plurality of monitoring stations. This point-to-multipoint connection passes through a broadcast unit that serves as a branching point of multiple connections. A status message transmission unit, disposed in the network device, transmits status messages over the point-to-multipoint connection when a status change is detected in the network device. The broadcast unit distributes these messages toward a plurality of monitoring stations in the system. Before reaching the destinations, the status messages are subjected to a status message format conversion unit so as to make their data format suitable for the recipient monitoring stations.

15 Claims, 17 Drawing Sheets

11a  P-MP CONNECTION MANAGEMENT TABLE

| DESTINATION (11a-1) | SVC ROUTE (11a-2) | CONNECTION ESTABLISHMENT STATUS (11a-3) |
|---|---|---|
| MONITORING CONTROLLER 30a | X X X X X X X X X | O K |
| MONITORING CONTROLLER 30b | Y Y Y Y Y Y Y Y Y | N G |

FIG. 4

32a STATUS MESSAGE STORAGE MANAGEMENT TABLE

| DEVICE NAME | CLASSIFICATION | SUPPLEMENTARY DATA | STORAGE SWITCH | STATUS |
|---|---|---|---|---|
| MONITORED CONTROLLER 10a | CIRCUIT CONDITION | #1 | REQUIRED | FAILURE OCCURRED |
| | CIRCUIT CONDITION | #2 | REQUIRED | NORMAL |
| | CIRCUIT CONDITION | #3 | REQUIRED | UNDER TEST |
| | CONNECTION XX | — | NOT REQUIRED | — |
| | POWER STATUS | — | REQUIRED | NORMAL |
| MONITORED CONTROLLER 10b | | | | NORMAL |

120 IDENTIFIER INCLUSIVE STATUS MESSAGE GENERATION TABLE

| ID=1 | CIRCUIT CONDITION | FAILURE OCCURRED | CIRCUIT #1 |
|---|---|---|---|
| ID=2 | CIRCUIT CONDITION | FAILURE OCCURRED | CIRCUIT #1 |

FIG. 12 (B)

121 IDENTIFIER INCLUSIVE STATUS MESSAGE TRANSMISSION TABLE

| MONITORING CONTROLLER | IDENTIFIER TRANSMITTED |
|---|---|
| 30a | 2 |

*34a PERIODICAL TRANSMISSION
MESSAGE MANAGEMENT TABLE

| COUNTER VALUE (FROM n TO 0) |
|---|

FIG. 14

NETWORK MONITORING SYSTEM, MONITORED CONTROLLER, AND MONITORING CONTROLLER

BACKGROUND OF THE INVENTION

1. Field of the Invention

The present invention relates to a network monitoring system, a monitored controller, and a monitoring controller, and more particularly to a network monitoring system, a monitored controller, and a monitoring controller with increased efficiency in network monitoring activities.

2. Description of the Related Art

A variety of user needs for telecommunications services have driven the evolution of today's network infrastructures, increasing their complexity and expanding their scale. In such circumstances, operations and maintenance of communication links require highly sophisticated network monitoring technologies which collect necessary data from network equipment and provide the maintenance engineers with useful information for their activities. More specifically, the network monitoring system should collect alarms and other status information from many pieces of transmission equipment deployed across a large geographical area, concentrate such information at a maintenance center, discover and isolate the problem, and inform the maintenance engineers of the location of the problem in a prompt and reliable manner.

Take an Asynchronous Transmission Mode (ATM) network for instance. In conventional monitoring systems, a point-to-point connection is established between a monitoring station and each ATM network device to be monitored, so that status information messages will be collected through the established connection. The monitoring station communicates with ATM network devices by using the Simple Network Management Protocol (SNMP), which is originally designed for TCP/IP network management. The SNMP protocol defines some techniques called "polling" and "trap" for handling of status information. Conventional network monitoring systems use this polling, trap, or both.

In a polling-based system, the network monitoring station collects status information from ATM network devices by transmitting query messages at regular intervals to request them to send back their local administrative information, including device configuration, functional status, and statistics. The network monitoring station then detects configuration changes and/or status changes by comparing the present information with the previous information. In this way, the polling-based system can collect administrative information in a reliable manner. This system, however, repeats such data collection at predetermined intervals, regardless of the presence of actual status changes in each individual ATM network device, and thus it often produces unwanted, redundant network traffic over the UNI and NNI networks. As such, conventional polling-based systems have a problem concerning the efficiency in the usage of network bandwidth.

On the other hand, in a trap-based network monitoring system, each occurrence of status changes will propagate to the network monitoring station in the form of an information message, or trap. An advantage of this system is the timeliness of administrative information delivery. However, since the message transmission process in this system involves no acknowledgement sequence, it may happen that a trap will be lost in the process of delivery because of traffic congestion or other problem conditions. It is impossible, in such a case, for the network monitoring station to know the occurrence of a status change in that ATM network device. A reliability problem of this kind exists in the conventional trap-based network monitoring systems. Furthermore, when a plurality of network monitoring stations are deployed, the ATM network devices should send the same trap messages to each individual monitoring station. This imposes additional workloads on the ATM network devices, as well as producing increased traffic over the NNI network.

As a compromise between the two approaches described above, there is another system that uses simple traps to detect the occurrence of each event and then performs polling operations to collect further information, subsequently to the detection. Conventionally, however, this architecture takes no consideration about the loss of trap information. Further, this system still produces redundant traffic since it mainly uses polling techniques to collect status information.

SUMMARY OF THE INVENTION

Taking the above into consideration, a first object of the present invention is to provide a network monitoring system which is designed to alleviate the workload imposed on network devices to be monitored, eliminate redundant network traffic, improve the quality of data transmission, and increase the efficiency in network monitoring activities.

Moreover, a second object of the present invention is to provide a controller to be monitored with increased efficiency in network monitoring activities.

Furthermore, a third object of the present invention is to provide a monitoring controller with increased efficiency in network monitoring activities.

To accomplish the first object, according to the present invention, there is provided a network monitoring system which employs a plurality of monitoring stations to observe status of controllers on a network. This network monitoring system comprises the following elements:

(a) a monitored controller being observed by the plurality of monitoring stations, comprising a connection set-up unit which establishes a point-to-multipoint connection, and a status message transmission unit which transmits status messages through the point-to-multipoint connection upon detection of a status change in the monitored controller;

(b) a broadcast unit which broadcasts the status messages through the point-to-multipoint connection; and (c) a plurality of monitoring controllers, coupled to the plurality of monitoring stations, each of which comprises a status message format conversion unit to convert the status messages received from the broadcast unit to a format suitable for the monitoring station being coupled thereto.

To accomplish the second object, according to the present invention, there is provided a monitored controller being observed by monitoring stations in a network monitoring system. This monitored controller comprises the following elements:

(a) a connection set-up unit which establishes a point-to-multipoint connection to the monitoring stations via a broadcast unit; and (b) a status message transmission unit which transmits status messages through the point-to-multipoint connection upon detection of a status change in the monitored controller.

To accomplish the third objects, according to the present invention, there is provided a monitoring controller coupled to a monitoring station in a network monitoring system. This monitoring station comprises the following elements:

(a) a status message reception unit which receives status messages sent from a network device being monitored;

(b) a status message format conversion unit which converts the status messages received by the status message reception unit to a format suitable for the monitoring station being coupled thereto; and (c) a status message transmission unit which transmits to the monitoring station the status messages converted by the status message format conversion unit.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a diagram which shows a P-MP connection management table;

FIG. 7 is a diagram which shows a status message storage management table of a second embodiment of the present invention;

FIGS. 12(A) and 12(B) are diagrams showing identifier inclusive status message management tables, and more specifically, FIG. 12(A) shows an identifier inclusive status message generation table, and FIG. 12(B) shows an identifier inclusive status message transmission table;

FIG. 14 is a diagram which shows a periodical transmission message management table;

DESCRIPTION OF THE PREFERRED EMBODIMENTS

Three embodiments of the present invention will be described below with reference to the accompanying drawings.

Figure 1:
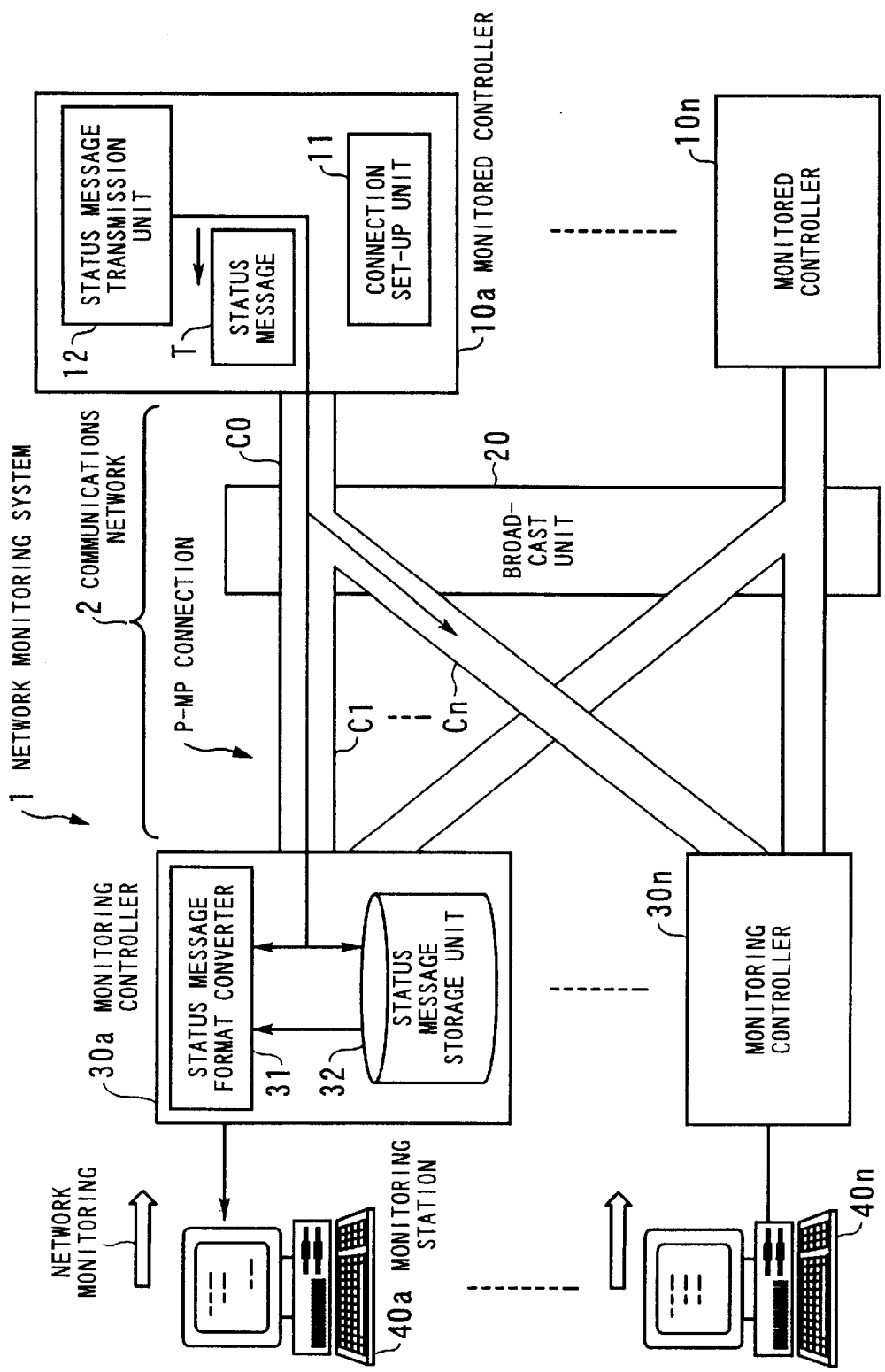
FIG. 1 is a conceptual view of a network monitoring system according to a first embodiment of the present invention.

Referring first to FIG. 1, the following section describes a first embodiment of the present invention. FIG. 1 is a conceptual view of a network monitoring system of the present invention. The illustrated network monitoring system 1 comprises the following functional units: monitored controllers 10a to 10n being subjected to the monitoring activities, a broadcast unit 20 serving as a junction point of network connections, monitoring controllers 30a to 30n which relay status information, and monitoring stations 40a to 40n which provide operator interface functions. These functional units are interconnected by a communications network 2.

Suppose here that the network monitoring system 1 is being applied to an ATM network. That is, the communications network 2 is actually an ATM network, and the monitored controllers 10a to 10n, broadcast unit 20, and monitoring controllers 30a to 30n are all ATM network devices (or ATM switches, more specifically). The monitoring stations 40a to 40n are implemented on workstations or other computer platforms.

A connection set-up unit 11, disposed in each monitored controller, establishes a point-to-multipoint (P-MP) connection between one monitored controller (e.g., monitored controller 10a) and the plurality of monitoring stations 40a to 40n via the broadcast unit 20. More specifically, the connection set-up unit 11 sets up a connection C0 over the communications network 2 to link the monitored controller 10a with the broadcast unit 20, and at the same time, it establishes n connections, C1 to Cn, between the broadcast unit 20 and the plurality of monitoring stations 40a to 40n (or the monitoring controllers 30a to 30n, actually).

When a status change is observed in the monitored controller 10a, a status message transmission unit 12 sends a status message T to the monitoring stations 40a to 40n via the broadcast unit 20. This status message T, serving as a "trap" defined in the SNMP specification, delivers event information such as faults or configuration changes occurred in the monitored controllers 10a to 10n. Such a status message T is transmitted immediately when each event occurs, and the broadcast unit 20 distributes it simultaneously to the plurality of monitoring stations 40a to 40n through the aforementioned P-MP connection.

A status message format converter 31, disposed in each monitoring controller, converts the broadcast status message T to a different format that the monitoring stations 40a to 40n can directly accept. That is, the status message format converter 31 makes the status message T comply with the existing data format that the monitoring stations 40a to 40n are using.

FIG. 1 also illustrates a status message storage unit 32 which stores a series of status messages T. The details of this function will be explained later, as a feature of the second embodiment of the present invention.

Figure 2:
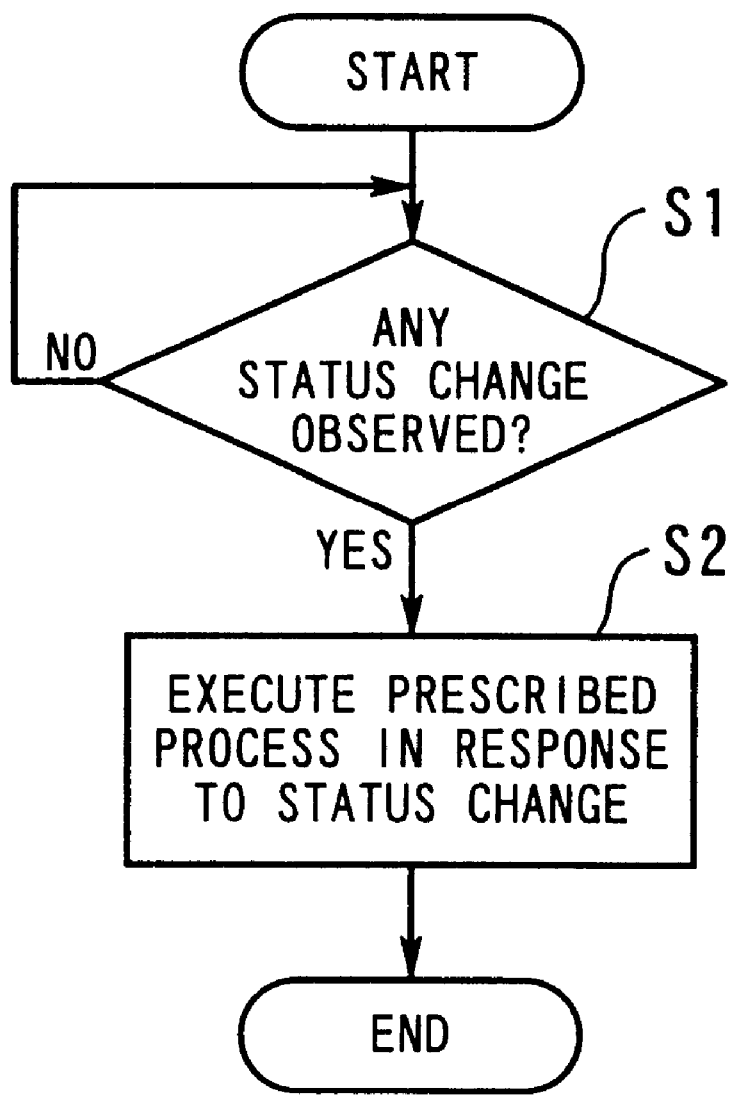
FIG. 2 is a flowchart which shows how status changes are managed.
Figure 3:
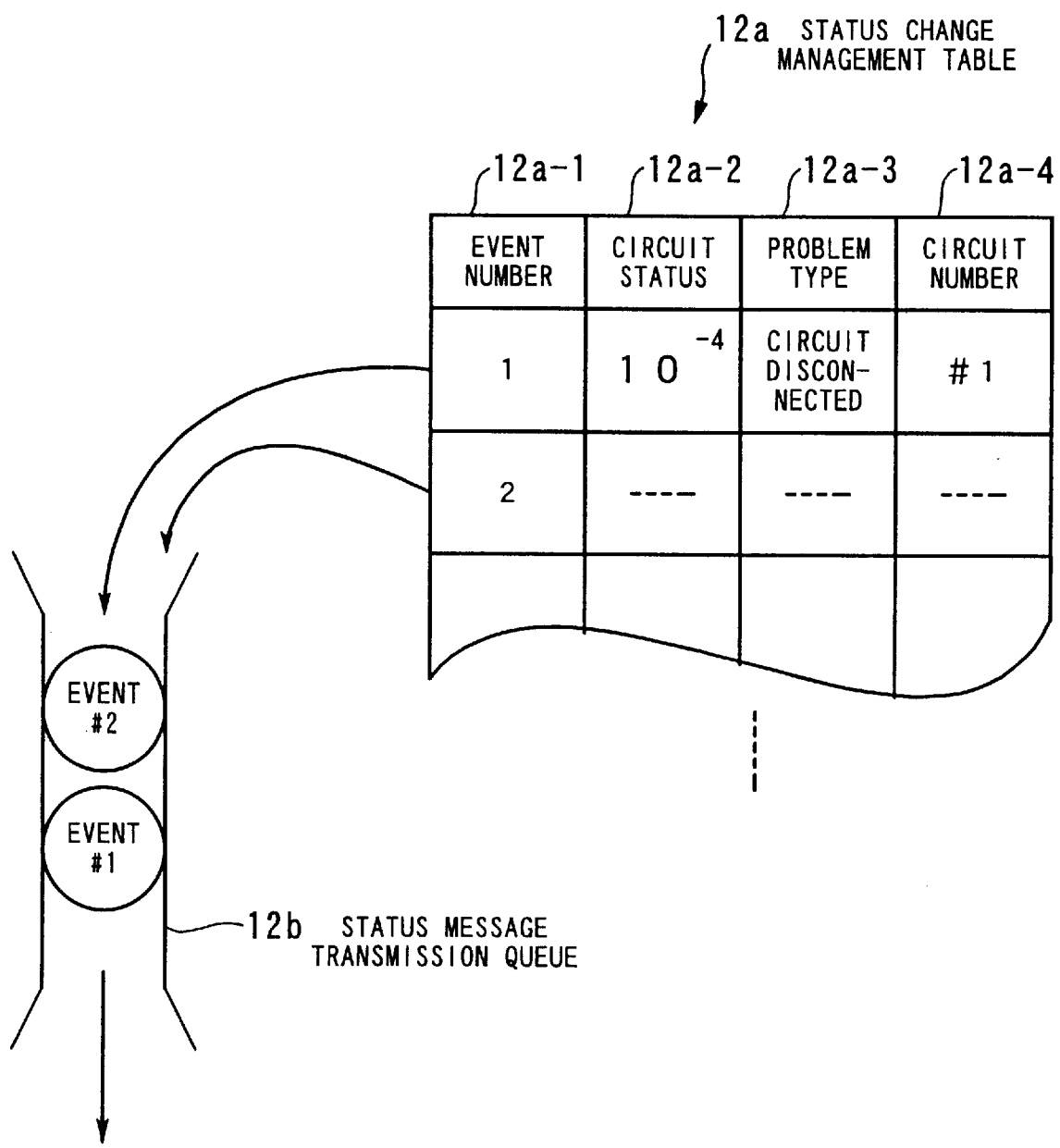
FIG. 3 is a diagram which illustrates the configuration of a status message transmission queue and a status change management table.

Referring now to FIGS. 2 and 3, the next section will present a process that the status message transmission unit 12 executes to manage the status change information. FIG. 2 is a flowchart which shows how each status change is handled.

(S1) The status message transmission unit 12 checks, at predetermined intervals, the behavior of each internal unit in the monitored controller 10a, as well as communication circuits connected thereto. If any status change is observed, the process advances to step S2. Otherwise, it repeats the present step S1.

(S2) The status message transmission unit 12 executes a prescribed process in response to the status change detected. That is, the status message transmission unit 12 enters the detected event into a status message transmission queue 12b, as well as recording it as a new entry of a status change management table 12a.

FIG. 3 illustrates the configuration of this status message transmission queue 12b and status change management table 12a. The status change management table 12a has an event number field 12a-1, a circuit status field 12a-2 which shows the quality level of a circuit, a problem type field 12a-3 which shows the details of a failure, and a circuit number field 12a-4. The first entry having an event number #1, for example, indicates that the circuit #1 with a quality level of $10^{-4}$ (i.e., one possible bit error per 100,000 bits) is disconnected. Besides being recorded in the status change management table 12a, this kind of events are put into the status message transmission queue 12b in the form of status messages and then transmitted to the monitoring stations in an orderly fashion.

Figure 5:
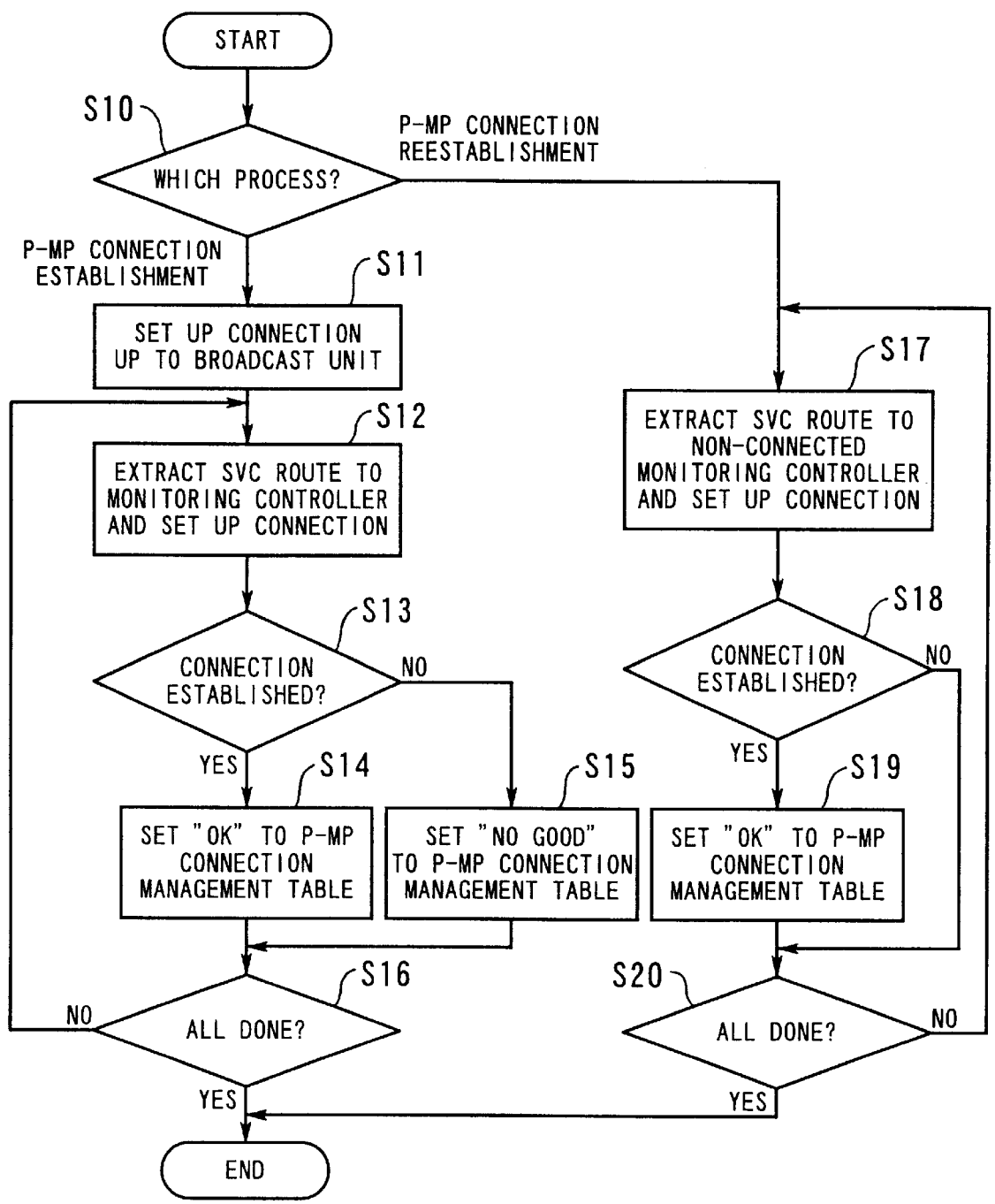
FIG. 5 is a flowchart which shows how a P-MP connection is established.

Referring next to FIGS. 4 and 5, the following section will explain how the connection set-up unit 11 makes a P-MP connection.

FIG. 4 shows a P-MP connection management table 11a. This table 11a has a destination field 11a-1, a Switched Virtual Connection (SVC) route field 11a-2, and a connection establishment status field 11a-3; FIG. 4 illustrates two specific examples of those field values. The connection set-up unit 11 uses this P-MP connection management table 11a when setting up a P-MP connection.

FIG. 5 is a flowchart which shows a process of PMP connection set-up. In this process flow, the connection set-up unit 11 scans the P-MP connection management table 11a to establish or reestablish network connections to the plurality of monitoring controllers 30a to 30n in a stepwise manner. Note here that a reference numeral "30" is used in the following explanation to represent a specific monitoring controller that is selected from among the monitoring controllers 30a to 30n as the destination of a connection being processed in each inner loop of this process. Likewise, a reference symbol "C" represents one of the connections C0 to Cn that is relevant to the monitoring controller 30 of interest.

(S10) There is a flag that determines whether to newly establish a P-MP connection or attempt to reestablish it. If this flag indicates the former task (P-MP connection establishment), the process advances to step S11. If it indicates the latter task (P-MP connection reestablishment), the process branches to step S17.

(S11) The connection set-up unit 11 sets up a connection C0 to the broadcast unit 20, which serves as a junction point of the P-MP connection being processed.

(S12) The connection set-up unit 11 extracts an SVC route from the P-MP connection management table 11a and sets up a connection C to the monitoring controller 30 along the extracted SVC route.

(S13) It is checked whether the connection C has been successfully established. If established, the process advances to step S14. If not, the process proceeds to step S15.

(S14) The connection set-up unit 11 enters "OK" to a relevant connection establishment status field 11a-3 in the P-MP connection management table 11a.

(S15) The connection set-up unit 11 enters "NO GOOD" to a relevant connection establishment status field 11a-3 in the P-MP connection management table 11a.

(S16) The connection set-up unit 11 examines whether it has finished the attempt of connection C for all monitoring controllers 30a to 30n. If finished, then the process is terminated. If there are untried connections, the process returns to step S12 and executes the next cycle.

(S17) Scanning the P-MP connection management table 11a, the connection set-up unit 11 finds a specific monitoring controller 30 whose connection establishment status field 11a-3 exhibits a "NO GOOD" state. If such a monitoring controller 30 is found, the connection set-up unit 11 extracts its corresponding SVC route from the table 11a and sets up a connection C to reach it along the extracted SVC route.

(S18) It is checked whether the connection C has been successfully established. If established, the process advances to step S19. If not, the process proceeds to step S20.

(S19) The connection set-up unit 11 alters the value of the aforementioned connection establishment status field 11a-3 in the P-MP connection management table 11a, from "NO GOOD" to "OK."

(S20) The connection set-up unit 11 examines whether it has finished the reestablishment of connections C for all monitoring controllers whose connection establishment status was "NO GOOD" before. When all attempts have finished, the process is terminated. If there remains an unestablished connection, the process returns to step S17 and executes the next cycle.

In this way, the connection set-up unit 11 retries to set up an unfinished portion of the P-MP connection at appropriate intervals, even if it partly failed to establish the connection with respect to some of the monitoring controllers 30a to 30n. As an alternative solution for such failures in the P-MP connection set-up operation, the monitored controllers 10a to 10n can previously establish point-to-point connections to reach the individual monitoring controllers 30a to 30n, respectively, and use them to send status messages T.

Figure 6:
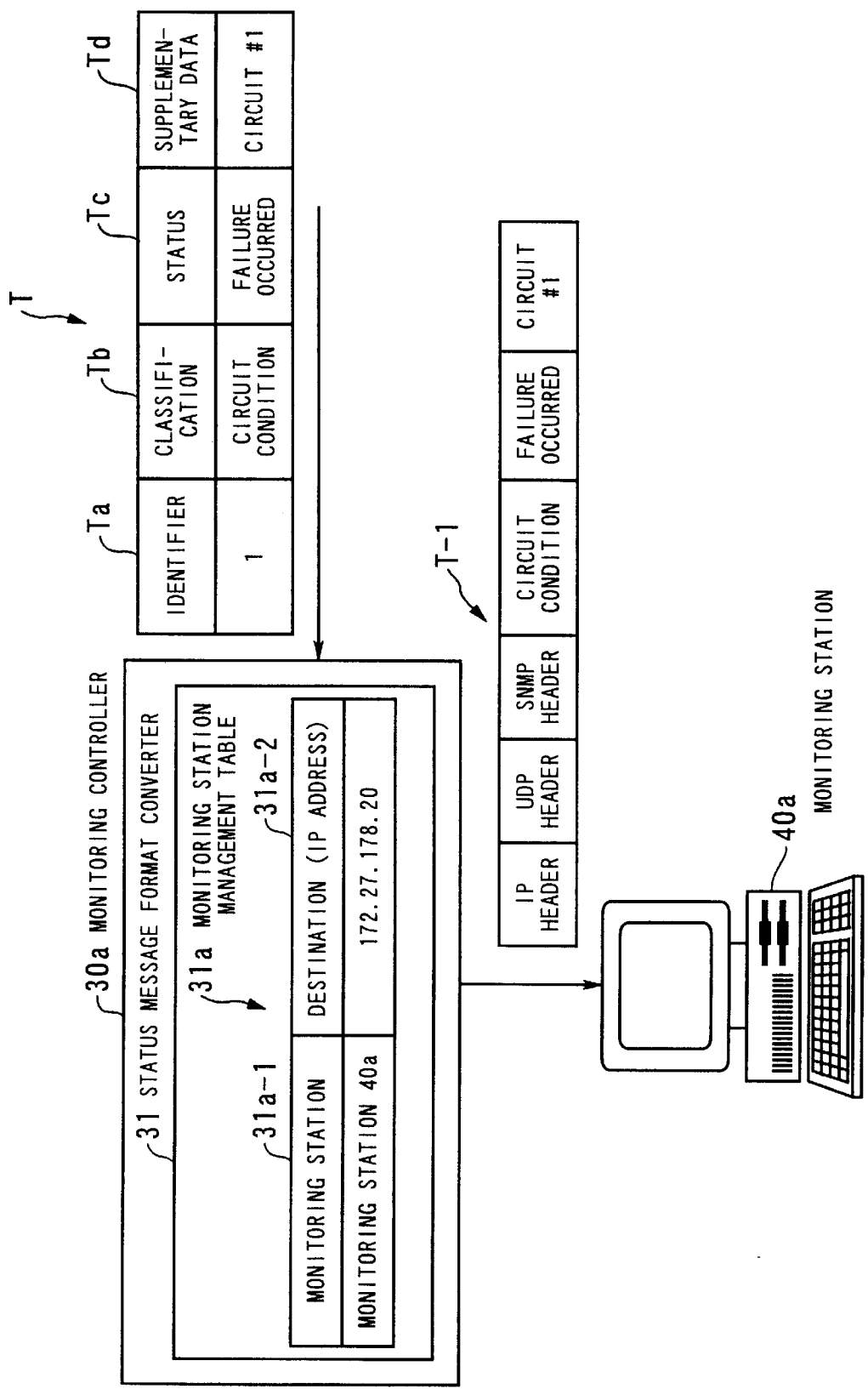
FIG. 6 is a diagram which outlines a format conversion process of status messages.

Now, the next section will focus on the format conversion mechanism for status messages T, which is provided by the status message format converter 31. FIG. 6 outlines this mechanism.

The monitoring controller 30a manages information on its corresponding monitoring station 40a in the form of a monitoring station management table 31a, which is prepared as part of the status message format converter 31. More specifically, the monitoring station management table 31a contains a first field 31a-1 to store the name of a monitoring station being directly linked to the monitoring controller 30a and a second field 31a-2 to store the station's destination address (IP address). In the present example of FIG. 6, the name of the monitoring station 40a and its IP address "172.27.178.20" are registered. Upon receipt of a status message T, the status message format converter 31 converts it to a format suitable for the monitoring operation performed by the monitoring station 40a, with reference to that monitoring station management table 31a. FIG. 6 shows the format of a status message T-1 that has been converted in this way.

The original status message T consists of an identifier field Ta ("1"), a classification field Tb ("CIRCUIT CONDITION"), a status field Tc ("FAILURE OCCURRED"), and a supplementary data field Td ("CIRCUIT #1"), where the text in the parentheses are specific field values of a status message T illustrated in FIG. 6. Based on this message, the status message format converter 31 creates a converted message T-1 having an IP header, a UDP header, and an SNMP header, in addition to the original contents (i.e., "CIRCUIT CONDITION," "FAILURE OCCURRED," and "CIRCUIT #1").

FIG. 6 shows an example of a message with an SNMP frame format on the assumption that the monitoring station 40a uses the SNMP protocol. The format supported by the status message format converter 31 is not restricted to this example, but it will convert messages to any other formats to make them comply with a protocol of each individual monitoring controller.

As described above, the network monitoring system 1 of the present invention allows each of the monitored controllers 10a to 10n to send status messages T through a 1:1 connection to the broadcast unit 20 and 1:n (P-MP) connections further to the plurality of monitoring stations 40a to 40n (or monitoring controllers 30a to 30n) that have been established beforehand. Recall here that conventional network monitoring systems use separate P-P connections to link the monitored controllers 10a to 10n with the monitoring stations 40a to 40n. In comparison with those conventional systems, the system of the present invention consumes only a small portion of network bandwidth between the monitored controllers 10a to 10n and the broadcast unit 20. This feature greatly contributes to the alleviation of overall traffic on the communications network 2. Since the communications network 2 actually has a complex structure, the use of a P-MP connection as proposed in the present invention is particularly effective in terms of network traffic control.

The present invention also eliminates the need for repeatedly sending the same status messages to a plurality of monitoring stations. More specifically, it is not necessary for the monitored controller 10a, for example, to send a status message T separately to the monitoring stations 40a to 40n, but it is allowed to transmit only one message for broadcast distribution. This feature reduces workloads imposed on the monitored controller 10a.

Furthermore, the present invention is distinctive in that the status message format converter 31 is disposed in each of the monitoring controllers 30a to 30n to convert the broadcasted status messages T to a different format suitable for each monitoring station 40a to 40n. This feature improves the operability of the network monitoring system, providing the operators with highly convenient environments.

Now, the next section will present a second embodiment of the present invention, which is distinguishable from the first embodiment in that a status message storage unit 32 is used.

Being disposed in each of the monitoring controllers 30a to 30n, this status message storage unit 32 collects and stores status messages T. As an optional feature, it can selectively store critical status messages T having high importance, while leaving out less important messages. Note here that the importance of status messages is proportional to the frequency of their delivery. Information concerning network faults, for instance, is of significant importance to the monitoring stations 40a to 40n, and thus it must be frequently collected. On the other hand, information concerning the system configuration, which is updated less frequently, has lower importance.

FIG. 7 shows a status message storage management table 32a. While being controlled as integral part of the status message storage unit 32, this table 32a comprises a device name field 32a-1, a classification field 32a-2, a supplementary data field 32a-3, a storage switch field 32a-4, and a status field 32a-5. In FIG. 7, the first row of the table 32a shows a specific situation where the monitored controller 10a is suffering from some failure with circuit #1. Here, the storage switch field 32a-4 is set or reset by instructions from the operator to determine whether to store status messages T.

Figure 8:
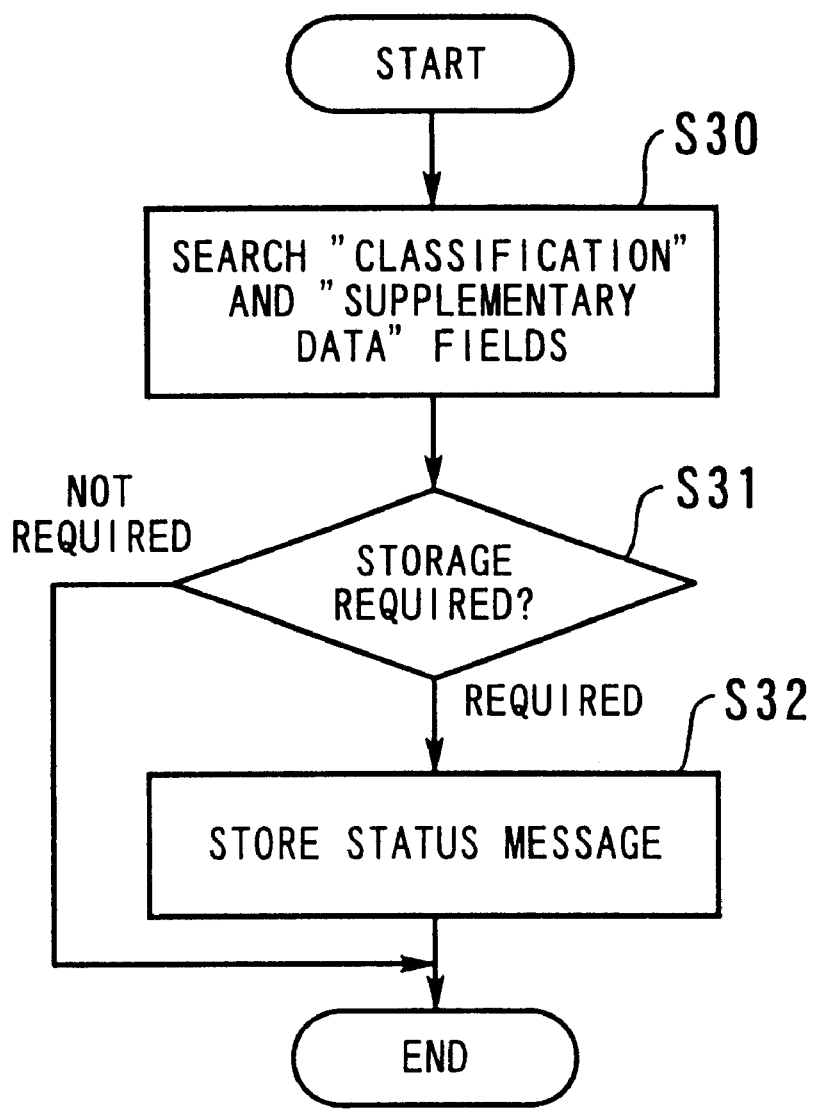
FIG. 8 is a flowchart which shows a process of storing status messages.

FIG. 8 is a flowchart which describes a process of storing status messages. The following explanation will proceed in the order of step numbers shown in FIG. 8, assuming that the monitoring controller 30a has received a status message T shown in FIG. 6.

(S30) Upon receipt of the message T containing a classification field value Tb and a supplementary data field value Td, the status message storage unit 32 searches the status message storage management table 32a for an entry similar to the received message.

(S31) When the status message storage unit 32 has found such an entry whose classification field 32a-2 and supplementary data field 32a-3 agree with the given field values Tb and Td, it then examines the storage switch field 32a-4 of that table entry. If the storage switch field 32a-4 indicates "REQUIRED," the process advances to step S32. If it indicates "NOT REQUIRED," the process is terminated.

(S32) The status message storage unit 32 stores the received status message T.

In this way, the status message storage unit 32 of the present invention examines the storage switch field 32a-4 in the status message storage management table 32a to determine whether to store status messages, depending on their importance. This feature also allows all received messages to be stored, regardless of their importance, by previously setting a value of "REQUIRED" to the storage switch field 32a-4 of every entry of the table 32a.

Figure 9:
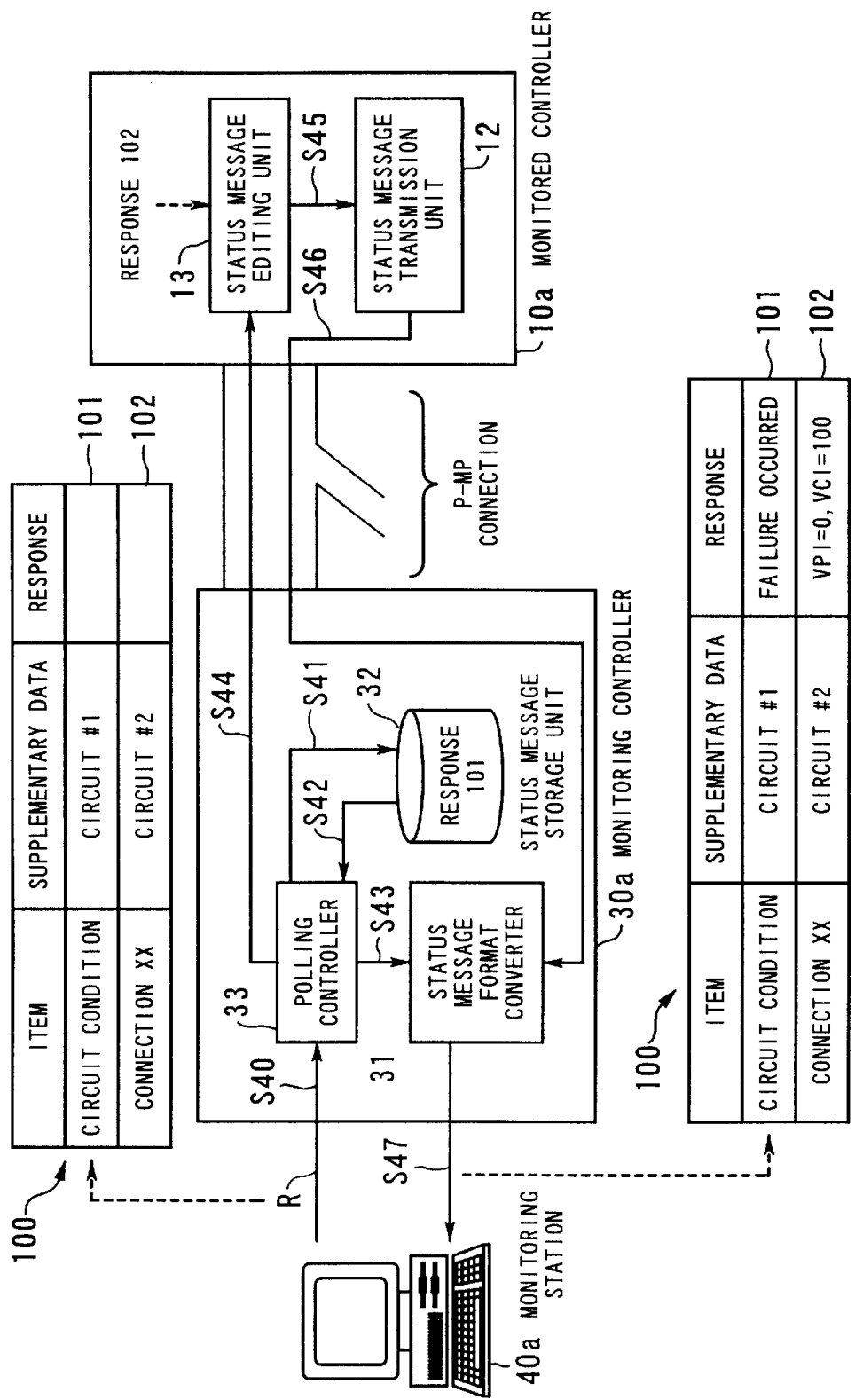
FIG. 9 is a diagram which shows how the status messages are collected.

Referring now to FIG. 9, the next section will explain the details of how the monitoring stations 40a to 40n will collect status messages T.

The monitoring controller 30a comprises a polling controller 33, which acquires appropriate status messages T in response to a status message collection request R issued by the monitoring station 40a. Here, the status message storage unit 32 or monitored controller 10a serves as the source of status messages. On the other hand, the monitored controller 10a comprises a status message editing unit 13. This status message editing unit 13 edits a status message T produced in the monitored controller 10a and supplies the status message transmission unit 12 with the message after editing. The message collection process is executed as indicated by step numbers S40 to S47 in FIG. 9.

(S40) The monitoring station 40a transmits a status message collection request R to the monitoring controller 30a. With this request R, the monitoring station 40a specifies what data items should be collected. FIG. 9 illustrates specific data items 100 in table form. More specifically, the monitoring station 40a is now expecting two responses 101 and 102 from the monitored controller 10a, which include: a "CIRCUIT CONDITION" of "CIRCUIT #1" (101) and a "CONNECTION XX" of "CIRCUIT #2" (102).

(S41) Upon receipt of the status message collection request R, the polling controller 33 searches the status message storage unit 32 to find records relevant to the data items 100 in question.

(S42) Since an appropriate data for the response 101 is found in the status message storage unit 32, the polling controller 33 extracts and edits that record to produce the response 101.

(S43) The polling controller 33 transmits the produced response 101 to the status message format converter 31.

(S44) Since no data for the expected response 102 is found in the status message storage unit 32, the polling controller 33 relays a relevant part of the status message collection request R to the status message editing unit 13 in the monitored controller 10a.

(S45) The status message editing unit 13 edits a message for the response 102, and supplies the resultant message to the status message transmission unit 12.

(S46) The status message transmission unit 12 transmits the response 102 to the status message format converter 31 in the monitoring controller 30a.

(S47) The status message format converter 31 transmits the responses 101 and 102 to the monitoring station 40a, after converting their format.

In this way, the monitoring controller 30a returns a response to the monitoring station 40a after appropriate editing operations, when the requested information is found locally in the status message storage unit 32. If no relevant information is found in the status message storage unit 32, the polling controller 33 requests the monitored controller 10a to provide the information.

As described above, according to the second embodiment of the present invention, the network monitoring system 1 employs a status message storage unit 32 in order to save status messages T that have been received. This configuration allows the monitoring stations 40a to 40n to receive appropriate status messages T, not from the monitored controllers 10a to 10n, but from the monitoring controllers 30a to 30n, if relevant data is available in their local storage. Therefore, the total traffic over the communications network 2 is greatly reduced. Further, the proposed configuration alleviates the workloads to be imposed on the monitoring controllers 30a to 30n, because of the flexibility in its importance-based control of status messages T.

The next section will describe a third embodiment of the present invention, which is distinguishable from the first embodiment in that the system employs a mechanism to avoid a loss of status messages. To this end, the monitored controllers affix an identifier to each individual status message T, and furthermore, the monitored controllers periodically send a special message containing the latest identifier value, as described below.

Figure 10:
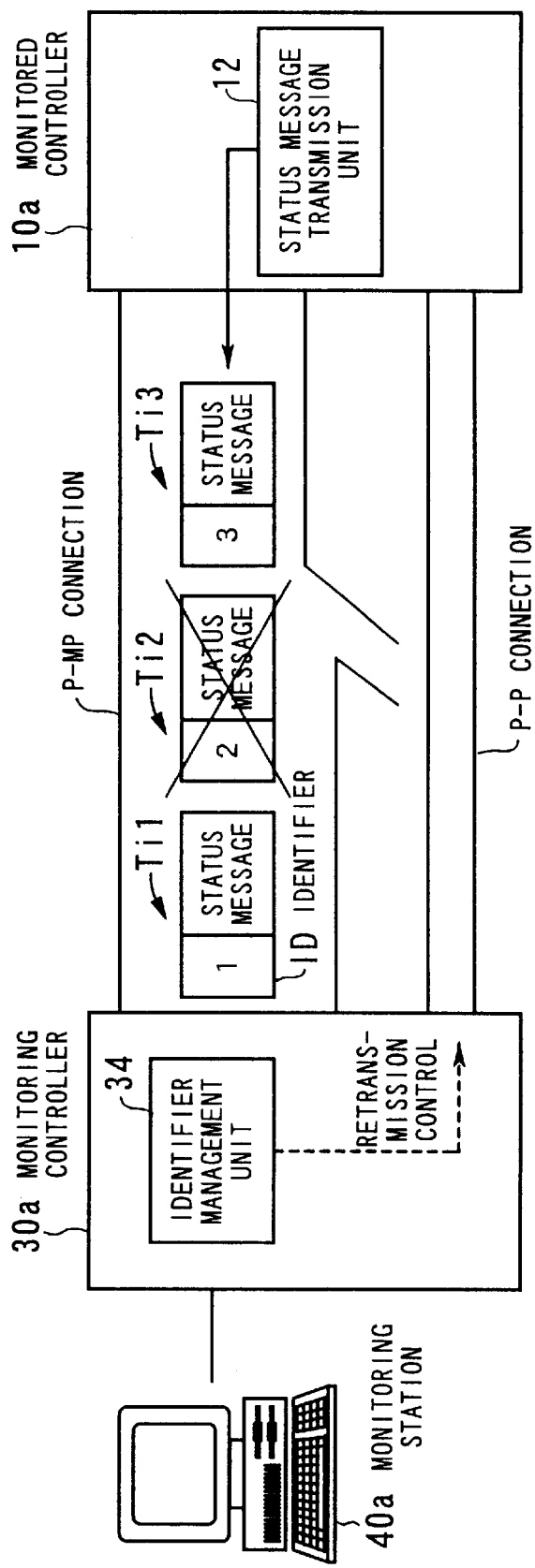
FIG. 10 is a conceptual view of a network monitoring system of a third embodiment of the present invention, which avoids a loss of status information by sending identifier inclusive status messages.

FIG. 10 illustrates how the system avoids a loss of status information by sending "identifier inclusive status messages" Ti, each of which is composed of a status message T and an identifier affixed to it. The monitoring controller 30a comprises an identifier management unit 34 which receives identifier inclusive status messages Ti from the status message transmission unit 12 in the monitored controller 10a. Each time an identifier inclusive status message Ti is received, the identifier management unit 34 compares its identifier with that obtained in the previous reception, thereby detecting the loss of an incoming status message T.

Suppose, for example, that the monitored controller 10a has transmitted three identifier inclusive status messages in the following sequence:

(1) Message Ti1 with an identifier ID1
(2) Message Ti2 with an identifier ID2
(3) Message Ti3 with an identifier ID3

It is also assumed that the second message Ti2 has been lost for some reason in the process of transmission over the P-MP connection.

In this problem situation, the identifier management unit 34 receives the message Ti1 first and then the message Ti3, thus recognizing that an intermediate message (i.e., the second message Ti2) must have been lost. When such data loss is detected, the identifier management unit 34 requests retransmission of the lost message, not by using the P-MP connection, but through an existing P-P connection.

Figure 11:
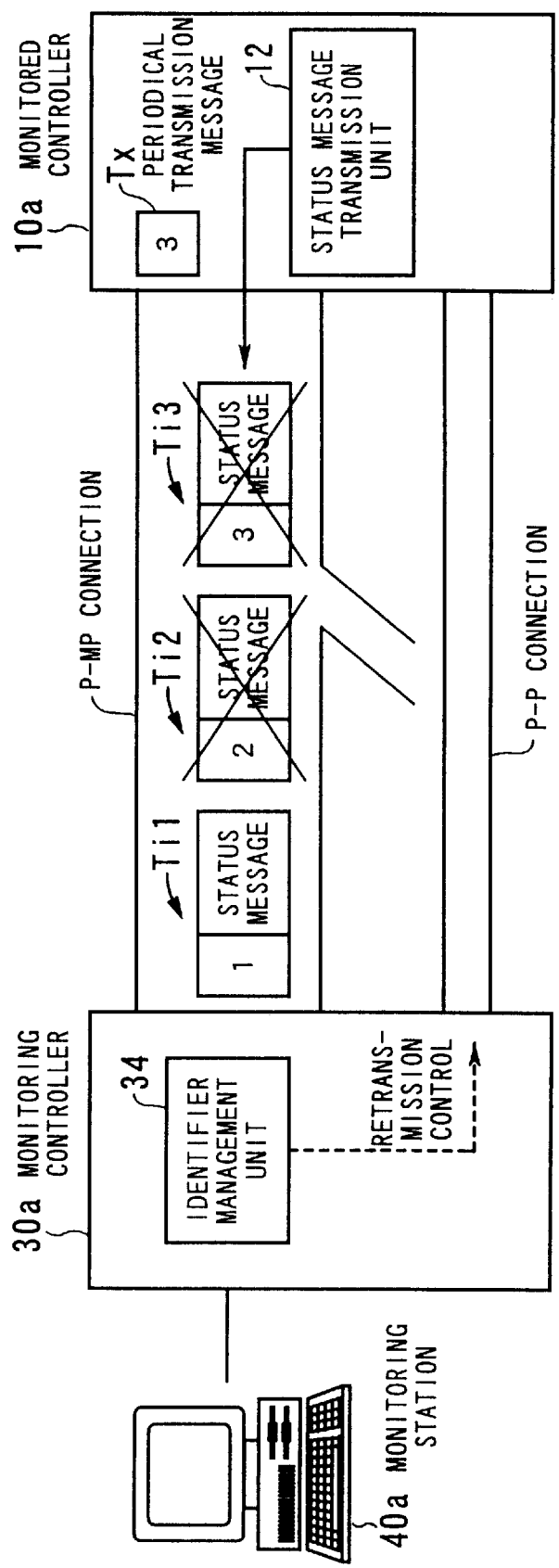
FIG. 11 is another conceptual view of a network monitoring system of the third embodiment of the present invention, which avoids a loss of status information by sending periodical transmission messages.

FIG. 11 shows the concept of periodical transmission messages implemented in a network monitoring system to avoid the loss of status information. Besides sending the identifier inclusive status messages as described above, the status message transmission unit 12 is designed to transmit a special message at predetermined intervals. Because of its periodical nature, this message is referred to as a "periodical transmission message."

Suppose again that the monitored controller 10a has transmitted three identifier inclusive status messages Ti1, Ti2, and Ti3, and that the second and third messages Ti2 and Ti3 have been lost in the process of transmission over the P-MP connection. In this situation, however, the identifier management unit 34 is unable to detect the loss of Ti2 and Ti3, because the aforementioned comparison of identifiers does not work.

The status message transmission unit 12 solves this problem by periodically sending a message containing the identifier ID attached to the identifier inclusive status message Ti that has been transmitted most recently. FIG. 11 illustrates this periodical transmission message Tx, which has an identifier ID3 that is the identifier of the last identifier inclusive status message Ti3. The message Tx permits the identifier management unit 34 to detect that the second and third messages Ti2 and Ti3 have been lost. Upon detection of lost messages, the status message storage unit 32 requests retransmission of them through a P-P connection as described earlier.

Figure 13:
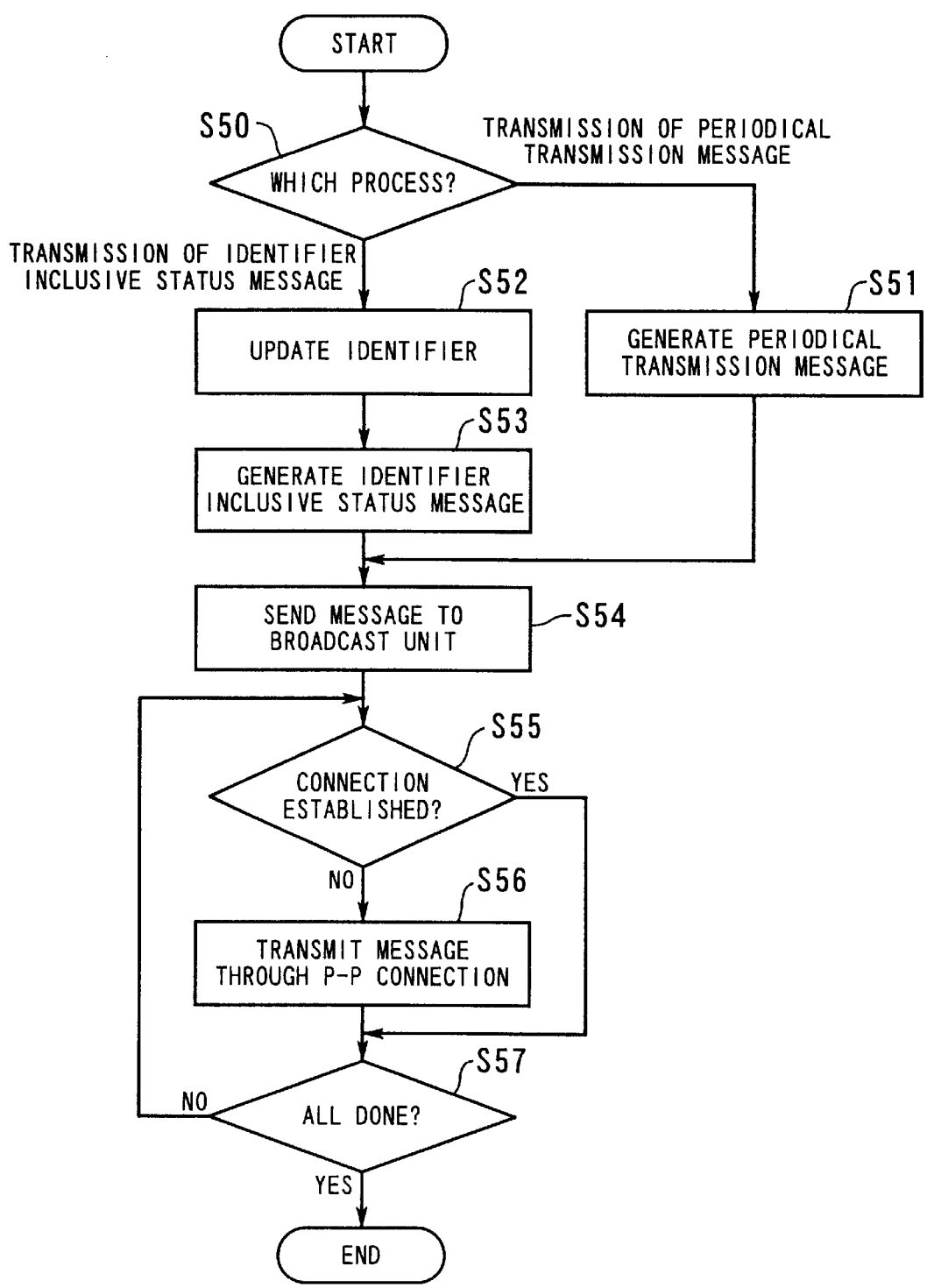
FIG. 13 is a flowchart which shows a process of transmitting an identifier inclusive status message and a periodical transmission message.

Referring next to FIGS. 12(A), 12(B) and 13, the following section will describe the details of how the status message transmission unit 12 transmits identifier inclusive status messages Ti and periodical transmission messages Tx.

FIG. 12(A) depicts an identifier inclusive status message generation table 120, and FIG. 12(B) shows an identifier inclusive status message transmission table 121. These two tables are collectively called "identifier inclusive status message management tables." The identifier inclusive status message generation table 120 is updated as shown in FIG. 12(A), each time an identifier inclusive status message Ti is produced. On the other hand, the identifier inclusive status message transmission table 121 records what identifier was used in the last transmission of an identifier inclusive status message Ti, separately for each individual monitoring controller 30a to 30n.

FIG. 13 is a flowchart which shows a process of transmitting an identifier inclusive status message Ti and a periodical transmission message Tx.

(S50) There is a flag that determines which kind of message to send. If this flag indicates the transmission of an identifier inclusive status message Ti, the process proceeds to step S52. If it indicates the transmission of a periodical transmission message Tx, the process proceeds to step S51.

(S51) The status message transmission unit 12 produces a periodical transmission message Tx and goes to step S54.

(S52) A new identifier ID is obtained.

(S53) The status message transmission unit 12 assembles an identifier inclusive status message Ti by affixing the new identifier ID to the status message T about to be transmitted.

(S54) The status message transmission unit 12 sends the message (Ti or Tx) to the broadcast unit 20. Here, the message is transmitted over a P-MP connection established between the monitored controllers 10a to 10n and the broadcast unit 20.

(S55) The availability of a P-MP connection is examined, with respect to each path from the broadcast unit 20 to the monitoring controllers 30a to 30n. If the individual connection path has been established, the process proceeds to step S57. Otherwise, the process advances to step S56.

(S56) The message (Ti or Tx) is transmitted over an existing P-P connection.

(S57) It is tested whether the message has been transmitted to all the monitoring controllers 30a to 30n. If the transmission is completed, the process is terminated. Otherwise, the process returns to step S55 to continue the transmission.

Figure 15:
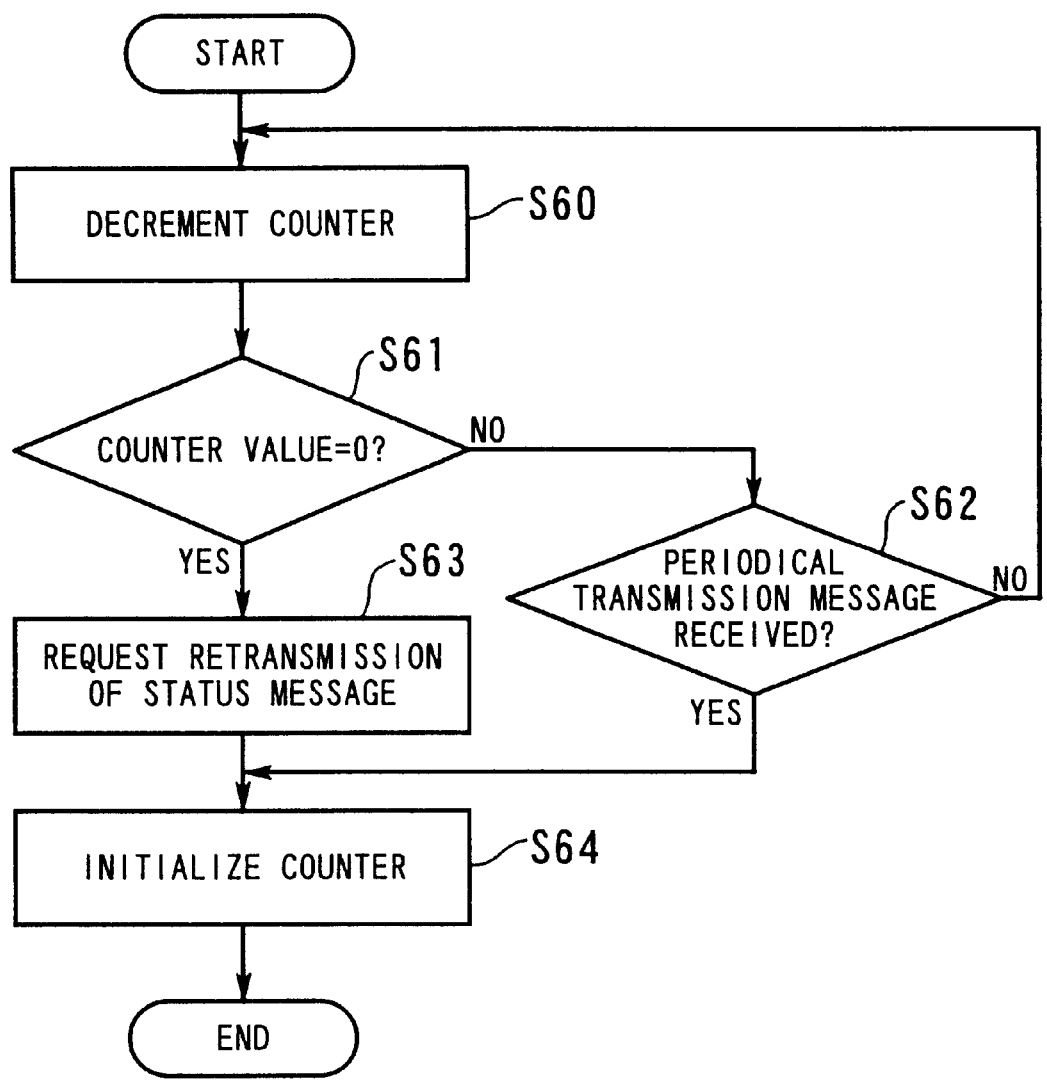
FIG. 15 is a flowchart which shows how to recognize a loss of periodical-transmission messages.

Referring now to FIGS. 14 and 15, the following section will explain how the identifier management unit 34 recognizes a loss of periodical transmission messages Tx.

FIG. 14 shows a periodical transmission message management table. This periodical transmission message management table 34a holds a counter value which starts at a predetermined initial value of n and counts down during its operation. The identifier management unit 34 decrements this counter, and if no new periodical transmission message Tx has been received by the time the counter value reaches zero, then it initiates a retransmission process, recognizing that some identifier inclusive status messages could have been lost.

FIG. 15 is a flowchart which shows how to recognize a loss of status information by using periodical transmission messages Tx.

(S60) The identifier management unit 34 decrements the counter in the periodical transmission message management table 34a.

(S61) If the resultant counter value is zero, the process advances to step S63. If not, the process advances to step S62.

(S62) The identifier management unit 34 determines whether a periodical transmission message Tx has been received before the counter reaches zero. If received, the process advances to step S64, and otherwise, the process returns to step S60.

(S63) The identifier management unit 34 requests the monitored controller 10a to retransmit the status messages T that are missing since the last identifier inclusive status message Ti was received.

(S64) The identifier management unit 34 initializes the counter value in the periodical transmission message management table 34a.

Now, the next section will describe how the identifier management unit 34 detects a loss of identifier inclusive status messages Ti.

Figure 16:
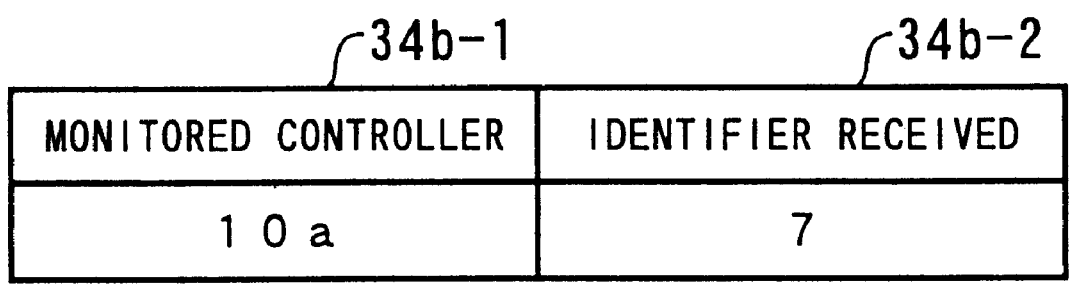
FIG. 16 is a diagram which shows an identifier management table.

FIG. 16 depicts an identifier management table. Under the control of the identifier management unit 34, this table 34b maintains a record consisting of a monitored controller field 34b-1 and a received identifier field 34b-2. This specific example of FIG. 16 shows that an identifier inclusive status message Ti with an identifier ID7 has been received from the monitored controller 10a.

Figure 17:
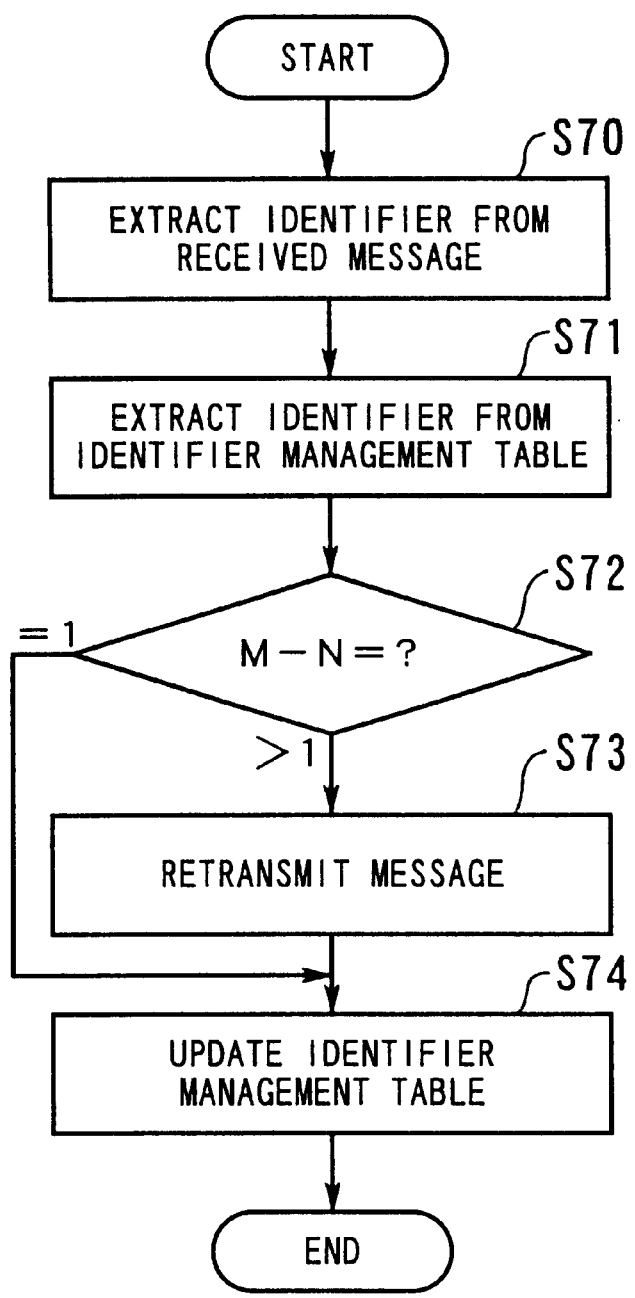
FIG. 17 is a flowchart which shows a process of detecting a loss of identifier inclusive status messages.

FIG. 17 is a flowchart which shows a process of detecting a loss of identifier inclusive status messages Ti.

(S70) The identifier management unit 34 extracts the identifier field ID from the received identifier inclusive status message Ti. Consider here that the extracted identifier field ID has a value of M.

(S71) The identifier management unit 34 extracts the received identifier field ID from the identifier management table 34b. Suppose here that the extracted identifier field ID has a value of N.

(S72) The identifier management unit 34 calculates (M−N). If (M−N)>1, then the process advances to step S73. If (M−N)=1, the process skips to step S74.

(S73) The identifier management unit 34 requests the monitored controller 10a to retransmit the missing status messages T having identifiers ID from (N+1) to (M−1).

(S74) The identifier management unit 34 updates the identifier management table 34b.

As described above, the network monitoring system 1 of the third embodiment is configured to detect a loss of incoming status information by watching identifier inclusive status messages Ti and periodical transmission messages Tx. This feature improves the quality and reliability of data transmission and in the network monitoring system.

In the above discussion, it has been assumed that the monitoring controllers 30a to 30n are ATM network devices deployed separately from the monitoring stations 40a to 40n. In actuality, however, the monitoring controllers 30a to 30n can be implemented as integral part of the monitoring stations 40a to 40n, respectively.

In summary, the network monitoring system of the present invention establishes a point-to-multipoint connection between one monitored controller and a plurality of monitoring controllers, and uses the connection to collect status messages from the monitored controller. Further, the proposed network monitoring system is configured to deliver the collected status messages to a monitoring station after converting the format of the messages. These features of the present invention alleviate the workload of the monitored controller, as well as reducing the network traffic that is produced in the process of collecting status information. This contributes to the improvement of efficiency in network monitoring activities.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network monitoring system which employs a plurality of monitoring stations to observe status of controllers on an ATM network, comprising:
  (a) a monitored controller being observed by said plurality of monitoring stations, comprising
   connection set-up means for establishing a point-to-multipoint connection over the ATM network, and
   status message transmission means for transmitting status messages through the point-to-multipoint connection upon detection of a status change in said monitored controller;
  (b) a broadcast unit which broadcasts the status messages through the point-to-multipoint connection; and
  (c) a plurality of monitoring controllers coupled to the plurality of monitoring stations, each being a destination of the point-to-multipoint connection, and each comprising status message format conversion means for converting the status messages received from said broadcast unit to a format suitable for the monitoring station being coupled thereto.

2. The network monitoring system according to claim 1, wherein said monitoring controller further comprises status message storage means for storing information contained in the status messages received from said broadcast unit.

3. The network monitoring system according to claim 2, wherein said status message storage means selectively stores information contained in the status messages having higher priorities.

4. The network monitoring system according to claim 1, wherein said connection set-up means attempts to reestablish a portion of the point-to-multipoint connection at predetermined intervals, when said connection set-up means has failed to establish said portion of the point-to-multipoint connection.

5. The network monitoring system according to claim 4, wherein said status message transmission means transmits the status messages through a point-to-point connection that is previously established between said monitored controller and one of said plurality of monitoring controllers, when said connection set-up means has failed to establish the point-to-multipoint connection.

6. The network monitoring system according to claim 1, wherein said status message transmission means transmits identifier inclusive status messages which are each composed of a status message and an identifier affixed thereto to make the status messages distinguishable from each other.

7. The network monitoring system according to claim 6, wherein the status message transmission means further transmits a periodical transmission message at predetermined intervals to send the identifier of the identifier inclusive status message that has been transmitted most recently.

8. A monitored controller being observed by a plurality of monitoring stations in a network monitoring system for an ATM network, comprising:
  connection set-up means for establishing a point-to-multipoint connection on the ATM network to reach the plurality of monitoring stations via a broadcast unit; and
  status message transmission means for transmitting status messages through the point-to-multipoint connection upon detection of a status change in the monitored controller.

9. The monitored controller according to claim 8, wherein said connection set-up means attempts to reestablish a portion of the point-to-multipoint connection at predetermined intervals, when said connection set-up means has failed to establish said portion of the point-to-multipoint connection.

10. The monitored controller according to claim 9, wherein said status message transmission means transmits the status messages through a point-to-point connection that is previously established, when said connection set-up means has failed to establish the point-to-multipoint connection.

11. The monitored controller according to claim 8, wherein said status message transmission means transmits identifier inclusive status messages which are composed of the status messages and identifiers affixed thereto to make the status messages distinguishable from each other.

12. The monitored controller according to claim 11, wherein said status message transmission means further transmits a periodical transmission message at predetermined intervals to send the identifier of the identifier inclusive status message that has been transmitted most recently.

13. A monitoring controller coupled to a monitoring station in a network monitoring system for an ATM network, comprising:
  status message reception means for receiving status messages sent from a plurality of network devices being monitored, through a point-to-multipoint connection established on the ATM network;
  status message format conversion means for converting the status messages received by said status message reception means to a format suitable for the monitoring station being coupled thereto; and
  status message transmission means for transmitting to the monitoring station the status messages converted by said status message format conversion means.

14. The monitoring controller according to claim 13, further comprising status message storage means for storing information contained in the status messages received from the network device being monitored.

15. The monitoring controller according to claim 14, wherein said status message storage means selectively stores information contained in the status messages having higher priorities.

* * * * *